United States Patent [19]

Morell et al.

[11] Patent Number: 4,892,014

[45] Date of Patent: Jan. 9, 1990

[54] ELECTRONIC CONTROLLER FOR AUTOMATIC TRANSMISSIONS

[75] Inventors: Thomas H. Morell, Grand Haven, Mich.; Frederick A. Schonfeld, Albuquerque, N. Mex.

[73] Assignee: Sparton Corporation, Jackson, Mich.

[21] Appl. No.: 150,985

[22] Filed: Feb. 1, 1988

[51] Int. Cl.$^4$ ............................................. B60K 41/06
[52] U.S. Cl. ...................................... 74/866; 74/861; 192/4 A; 192/4 C
[58] Field of Search ..................... 74/866, 856, 861; 192/4 A, 4 C, 1.33; 180/272, 273; 364/424.1

[56] References Cited

U.S. PATENT DOCUMENTS

| | | | |
|---|---|---|---|
| 2,499,276 | 2/1950 | Mullins et al. | 194/4 A |
| 2,970,679 | 2/1961 | Suller et al. | 192/4 A |
| 3,895,698 | 7/1975 | Fontaine | 192/1.33 |
| 3,937,105 | 2/1976 | Arai et al. | 74/866 X |
| 3,942,614 | 3/1976 | Thompson | 192/4 A |
| 4,187,935 | 2/1980 | O'Hern | 192/4 A |
| 4,355,698 | 10/1982 | Barnes et al. | 192/4 A X |
| 4,392,544 | 7/1983 | Dilno | 180/273 |
| 4,558,612 | 12/1985 | Shimizu et al. | 74/886 X |
| 4,583,171 | 4/1986 | Hara et al. | 364/424.1 |
| 4,629,043 | 12/1986 | Matsuo et al. | 192/4 A |

Primary Examiner—Dwight G. Diehl
Attorney, Agent, or Firm—Reising, Ethington, Barnard, Perry & Milton

[57] ABSTRACT

A microprocessor controlled automatic transmission range shift selector positions the range shift valve in accordance with a shift request by an electric motor. A feedback transducer provides valve position information for motor control purposes. Vehicle conditions transducers including a door switch, a seat switch, vehicle speed and RPM sensors, ignition circuit status and key presence detectors, a parking brake sensor and a foot brake switch provide inputs to the microprocessor which is programmed to determine appropriate shifts to prevent requested range shifts in some cases and automatically initiating shifts into park in other cases. An automatic parking brake actuator and door lock actuators are also controlled by the microprocessor system.

2 Claims, 7 Drawing Sheets

ELECTRONIC CONTROLLER FOR AUTOMATIC TRANSMISSIONS

FIELD OF THE INVENTION

This invention relates to a programmable controller for transmission range selection in accordance with selected vehicle conditions as well as for vehicle parking brake actuation.

BACKGROUND OF THE INVENTION

Automatic transmissions for automotive vehicles have used mechanical, hydraulic, electrical or hybrid controls responsive to mechanical, hydraulic or electrical input signals. The most common type for automobiles and light trucks uses a hydraulic control system for determining optimum gear ratio with a manually operated, mechanically positioned range selector. The range selector usually specifically demands park, neutral, or reverse operation or a forward range comprising a few different gear ratios selectable by the hydraulic control dependant on demand and speed variables. The advent of microprocessor controls on automotive vehicles and the ever increasing reliability and cost effectiveness of such controls has brought proposals for extending electronic control to transmissions. An incentive for adopting these controls is the versatility of the controls and the relative ease of incorporating inputs other than those necessary for determining the proper gear ratio. Another incentive is to eliminate the traditional mechanical connection between the driver's station and the transmission.

U.S. Pat. No. 4,583,171 discloses a transmission control device having a microcomputer having vehicle load and speed for inputs as well as operator selection switches for desired range. The output of the microcomputer controls two actuators, a buzzer and some indicating lights for signifying the operator chosen range. The first actuator is for range selection and comprises a hydraulic servomechanism combined with an electromagnetic valve, or an electrically driven servomechanism combined with an electric motor. The computer decides on the basis of vehicle speed and the throttle angle whether the selected range is allowable. For example, to allow a shift from the park range to the reverse range, the vehicle speed must be near zero. The second actuator is operated to make the actual gear ratio shift as calculated by the microcomputer from the speed and load data.

U.S. Pat. No. 3,937,105 discloses a transmission control comprising a hard-wired logic circuit responding to the key switch state, speed, throttle position and range selection inputs for controlling a transmission having solenoid operated hydraulic valves for range and gear ratio control. Information regarding range is utilized only by the logic circuit; only specific valve operating commands for individual gear ratios etc. are presented to the transmission. The transmission includes a park mechanism. When the key switch is turned off and the vehicle speed is below some value (5 mph), the transmission is automatically shifted into park mode.

SUMMARY OF THE INVENTION

It is therefore an object of the invention to overcome certain disadvantages in the prior proposals and to provide an improved transmission selector control. Another object is to provide such a control applicable to conventional transmission designs without alteration and applicable to proposed transmissions operated by solenoid valves or the like. It is a further object to provide automatic parking brake actuation in conjunction with the transmission control.

The invention is carried out by an electronic transmission controller for an automatic transmission having neutral, reverse, forward and park ranges and subject to range selection by electrical signals from the controller, the controller comprising; speed sensors for sensing vehicle speed and engine speed, ignition sensors for sensing whether the ignition is on and whether the key is in the ignition switch, means for controlling the transmission park range in response to preset values of sensed vehicle conditions, and programmable electronic means coupled to the sensors for producing electrical signals for range selection, the electronic means being programmed to limit the transmission to park range on the basis of prescribed sensor conditions.

The invention comprehends controlling the park range by preventing a shift out of park range under certain conditions and by forcing a shift to park range under certain other conditions.

The invention also provides an automatic parking brake actuator controlled for brake application and release by the transmission controller.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The invention draws upon well established electronic control principles and commercially available electronic hardware to operate specially designed mechanical components in an automotive vehicle for the improved operation of the vehicle. The vehicle is enhanced by requiring less operator attention in the performance of some necessary functions, such as shifting to park range when appropriate, and by preventing transmission range changes when conditions are not suitable. A result is better vehicle operation and extended life of the transmission.

Figure 1:
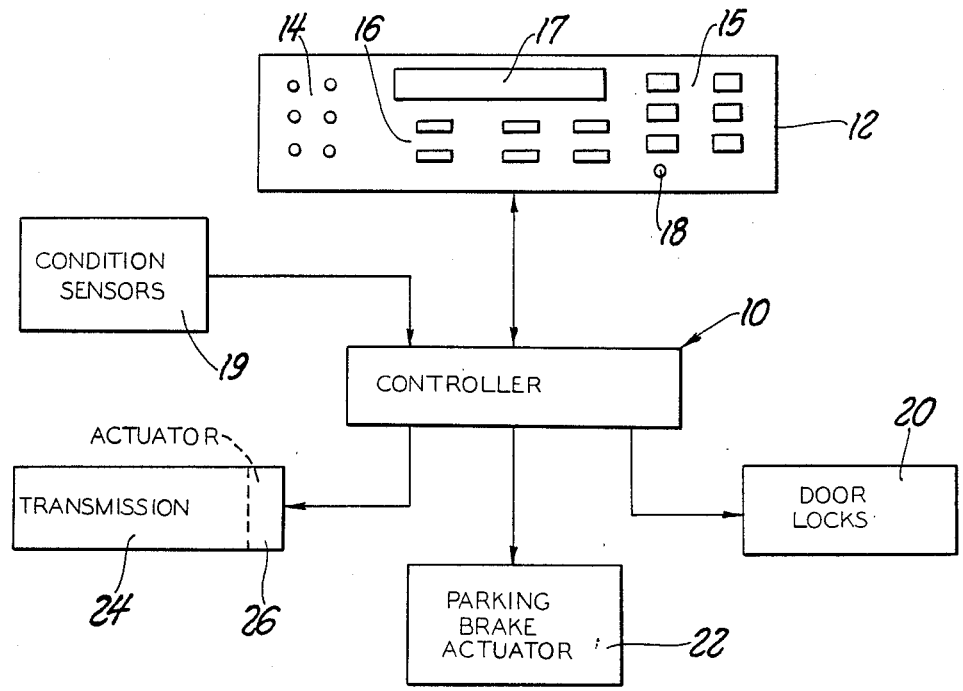
FIG. 1 is a block diagram of a vehicle system with a transmission controller according to the invention.

Considering the invention from the system point of view, FIG. 1 shows the relationship of the electronic control devices with one another and with the mechanical elements of the vehicle controlled by the devices. An electrical controller 10 has two way communication with an instrument panel 12 carrying selector push button switches or selector switches 14 for manual selection of the transmission range and displays comprising position indicators 15, fault indicators 16 and an ASCII display 17 for displaying the selected range, error messages and other information, respectively. The push button switches 14 are labelled to correspond to the available transmission ranges: "PARK", "NEUTRAL", "REVERSE", "OVERDRIVE", "DRIVE", "SECOND", and "FIRST", for example. The position indicator 15 is an array of selectively lighted legends bearing the same labels as the push buttons. The illuminated label identifies the current transmission status. The fault indicator 16 is another array of legends which are selectively lighted by microprocessor instruction to advise the operator of the reason for any failure to execute the requested shift. The legends preferably are "BRAKE PEDAL", "SEAT BELT", "INVALID SPEED", "INVALID RPM", "PARKING BRAKE", "BAD SHIFT", "OVERRIDE" and "SERVICE". Still another fault or information display 17 comprises a 20 character ASCII intelligent display controlled by the microprocessor for showing many other messages. An override switch 18 on the instrument panel is effective to cause the transmission to be shifted from park to neutral when the key is in the lock but without turning on the ignition; this is useful when the vehicle is to be towed.

A number of condition sensors 19 provide inputs to the controller 10 on the condition of the vehicle. The sensors include both analog measuring devices and condition responsive switches. Analog devices measure engine speed, vehicle speed, transmission manual valve position, and parking brake cable tension, while switches are used to detect ignition switch on, ignition key presence, brake application, seat belt fastened, door open and weight on the drivers seat. Outputs from the controller 10 actuate door locks 20, a parking brake actuator 22 and the transmission 24 which has an actuator 26.

Figure 2:
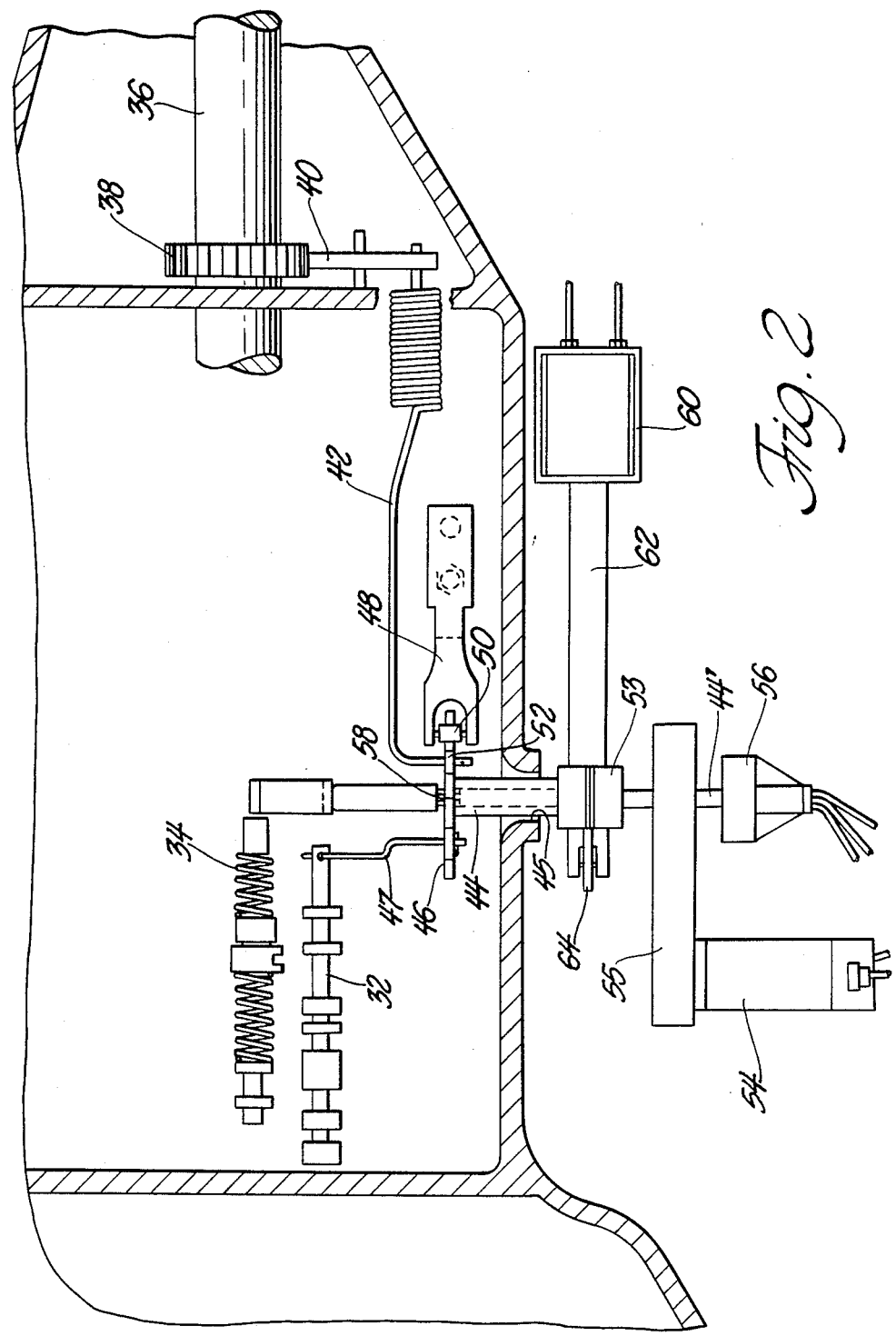
FIG. 2 is an elevation of a transmission having an actuator according to the invention.

Referring to FIG. 2, a transmission housing 30 contains, in addition to gear mechanisms, not shown, a manual shift valve 32, a throttle downshift valve 34, an output shaft 36 carrying a gear 38, a park pawl 40 selectively engaging the gear 38, a park pawl actuator 42, a tubular rotary control shaft 44 passing through a port 45 in the housing 30, and a bell crank 46 carried on the shaft 44 for rotation therewith and drivingly connected through a link 47 to the shift valve 32 and directly to the park pawl actuating rod 42. A detent spring 48 holds a roller 50 against a detent surface 52 on the bell crank 46 for urging the control shaft to discrete positions, one for each transmission range. Thus the shift valve 32 is longitudinally moved from one range position to another as the shaft is rotated. The shaft 44 is joined by a coupler 53 to an extension shaft 44'. A motor 54 is drivingly coupled through a gear drive 55 to the shaft 44' for positioning the shift valve 32. A feedback potentiometer 56 is also connected to the shaft 44' to develop a voltage that is proportional to the shaft angle relative to a datum position. Finally, an inner shaft 58 rotatably mounted within the shaft 44 is operatively connected to the downshift valve 34 and is operated by a kickdown solenoid 60 which is connected through a link 62, a lever 64 and the coupler 53 to the inner shaft 58. The mechanism within the housing is generally conventional in the automatic transmission art and is driven by exterior mechanical links. To implement this invention, the exterior components described above are specially adapted to utilize electrically actuated motors for operating the valves and the parking pawl.

Figure 3:
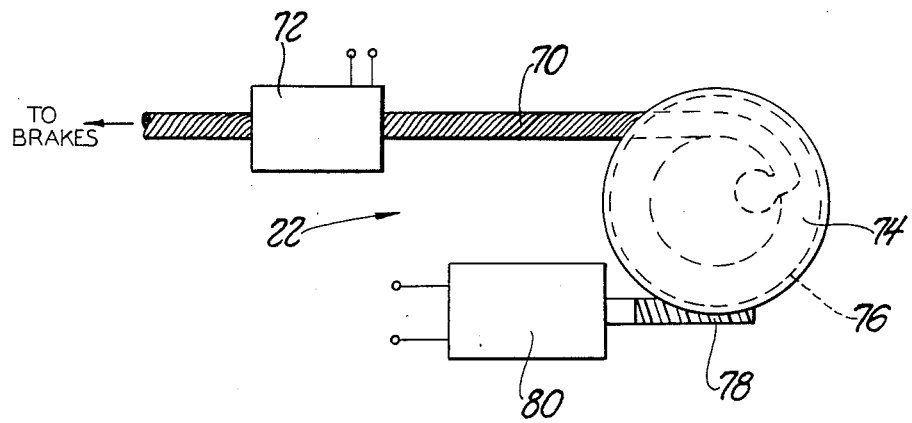
FIG. 3 is an elevation of the parking brake actuator of FIG. 1.

The parking brake actuator 22 is shown in FIG. 3. A conventional cable operated parking brake arrangement is used except that the actuation is accomplished without manual operation. A cable 70 for applying tension to the brakes incorporates a tension sensor 72 including a load cell for producing an analog output voltage representing the cable tension. One end of the cable 70 is wound upon a pulley 74. A worm gear is 76 formed in one rim of the pulley and a worm 78 driven by a motor 80 engages the worm gear to rotate the pulley 74. The motor 80 is driven in either direction to load or unload the cable 70 to achieve high or low tension limits. High tension corresponds to parking brake application and low tension corresponds to parking brake release. The tension signal provides a feedback to the controller 10 which determines operation of the motor 80 for brake application or release. When the motor 80 is not energized, the pulley is locked against rotation by the worm gear arrangement which is unable to drive the motor 80.

Figure 4:
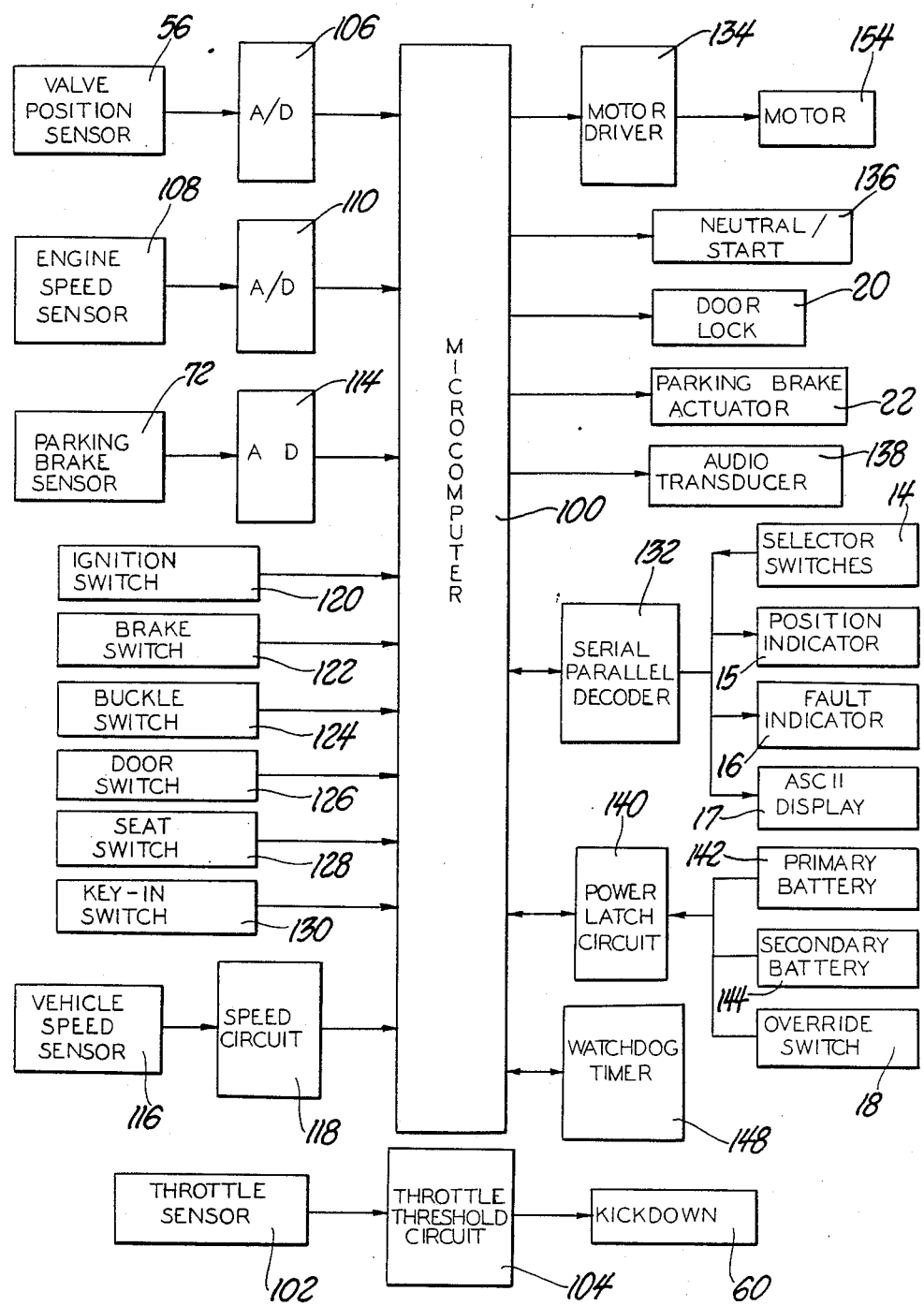
FIG. 4 is a block diagram of a computer and its inputs and outputs comprising the controller system according to the invention.

The electronic controller 10 for operating the transmission and the parking brake comprises a microcomputer such as the Intel Corp. 8051 microcomputer. As shown in FIG. 4, the microcomputer 100 has a number of inputs and outputs, generally described in the discussion of FIG. 1. In addition, a circuit separate from the microprocessor for operating the kickdown solenoid 60 comprises a throttle sensor 102 developing a voltage proportional to the throttle opening. A throttle threshold circuit 104 triggered by a sensor voltage level representing a throttle opening of 85% to 100% produces a solenoid operating current to energize the kickdown solenoid 60 which, in turn, operates the downshift valve 34 to shift the transmission to passing gear.

Considering first the analog sensors, the valve position sensor or the feedback potentiometer 56 outputs a voltage varying linearly with the shaft angle. This voltage is fed to an analog to digital converter (A/D) 106 which translates the voltage to an 8 bit digital signal which is ported into the microprocessor 100. An engine speed sensor also produces a linear voltage proportional to RPM and A/D 110 converts it to digital form and sends that signal to the microprocessor. Similarly the parking brake sensor 72 yields an analog voltage in accordance with the brake cable tension and the A/D 114 forms a corresponding digital signal for use by the microprocessor. The vehicle speed sensor 116 is a standard pickup sensing the rotation of a toothed wheel and generating pulses having a frequency proportional to speed. A speed circuit 118 converts the pulses to 5 volt pulses and feeds these to the microprocessor. There the speed is monitored by counting timer cycles between pulses. The most recent speed value is written into RAM and is available at all times to the microprocessor.

The switches 120–130 provide their binary inputs directly to the microprocessor 100. The ignition switch 120 provides an input when the engine ignition is on. The brake switch 122, which commonly is used to energize the vehicle brake lights, provides a signal when the brake pedal is depressed. The buckle switch 124 is closed when the drivers' seat belt is buckled. The door switch 126, which commonly turns on interior lights when the driver's door is opened, is used to give an indication to the microprocessor that the door is open. The seat switch 130 is mounted in the driver's seat and responds to the driver's weight to sense his presence in the vehicle. The door switch 126 and the seat switch 130 are used together to imply that the driver is absent or present. The key-in switch 130 is mounted in the ignition key lock to sense the key when it is present in the lock.

The other input information is provided by the selector switches 14 which are coupled to the microprocessor 100 by a serial/parallel decoder 132. When a selector switch is operated an interrupt signal is sent to the microprocessor which then receives the push button switch information via the decoder. The decoder 132 also sends information to the position indicators 15, the fault indicators 16 and the ASCII display 17. The decoder 132 selectively addresses any one of the units 14, 15, 16 or 17 and transmits serial data to or from the addressed unit.

The motor 54 which positions the manual shift valve 32 is controlled by the microprocessor through a motor driver 134. The motor driver responds to input signals to drive the motor clockwise, counterclockwise or not at all. Generally the motor is supplied with a fixed voltage when running to attain a constant speed, however the control can turn the voltage on in pulses to yield a lower speed. This ability is utilized to slow the motor when it closely approaches its target position as revealed by the valve position sensor 56.

A group of outputs directly accessed by the microprocessor 100 are the neutral/start switch 136, the door lock actuator circuit 20, the parking brake actuator 22, and an audio transducer 138. The neutral/start switch 136 is used to disable the engine starter circuit when the transmission setting is other than neutral or park. The door lock and parking brake are actuated or released as appropriate in accordance with the microprocessor program. The audio transducer 138 is controlled to give a long or short tone when execution of a range selection fails or is successful, respectively, thereby reinforcing visual display information.

A power latch circuit 140 maintains power to the transmission control under special circumstances when the ignition switch is off. Power is normally supplied by a primary battery 142 which is the normal vehicle battery but it is preferred to have available a secondary battery as well to insure operability of the system in the event the primary battery fails or is removed. The ignition circuit is used to initiate power to the control at the power latching relay 140. Once power has been applied, the latching relay is held on. When the ignition switch is turned off the microprocessor tries to shift to park if not already there, and maintains power on through the power latching relay for a predetermined time to allow the shift to park to occur. Then, if the ignition circuit has not been turned on again, the latch is released to remove power from the system, thereby conserving battery energy.

An override function also uses the power latch relay to supply power to the system when the ignition switch is off. If it is desired to place the transmission in neutral with the ignition off while it is being towed through a carwash, for example, or for servicing by a mechanic, an override switch 18 can be manually selected and if the ignition key is in the lock the power latch circuit 140 will apply power to the system for a short time for the microprocessor to effect a shift to neutral while ignoring all other shift criteria. When the power is removed the transmission remains in neutral until the next time that the ignition switch is turned on.

A watchdog circuit 148 for rebooting the software in case of a malfunction includes a monostable multivibrator arranged to send a pulse to the reset port of the microprocessor, causing the microprocessor to reset and reboot its software for continued operation. When the software is executing properly the microprocessor issues pulses to the multivibrator often enough to retrigger the multivibrator and prevent it from timing out.

The primary objective of the system is to evaluate the selector switch 14 input against other information gathered about the state of the transmission and the vehicle to determine, on the basis of rules embedded in the microprocessor software, whether the selection should be executed and, if the answer is affirmative, to move the shift valve 32 to the new position. Often, another action is required as well; for example, parking brake actuation and door lock actuation. For each range there is a target position of the valve and the corresponding target code is stored in ROM. The value output by the valve position sensor 56 is compared to the target and the direction of required motor 54 rotation is determined and the motor is suitably activated through the driver 134. The microprocessor compares the changing valve position with the target and slows the motor when it is close to the target and stops the motor when the target is reached, thereby completing the required action. Giving an indication of the new selected range via the position indicator 15 and the audio transducer 138 is also accomplished at this point. In the event of failure to shift to the requested range, the reason is given by the fault indicator 16 or the ASCII display 17.

In this embodiment of the system important objectives center around the park mode to assure that the system does not move out of park when conditions are not right and to actually move into park without a manual request when the vehicle conditions require it.

Positive Park Selection

Positive park selection prevents the vehicle from being left by the driver in any range except park. Two sets of conditions lead to the automatic or positive park selection: (1) The ignition switch is off and the vehicle speed is below a set value, say, 3 mph. (2) The driver's door is open, the driver's seat is unweighted and the vehicle speed is below the set value. In addition, a minimum engine speed is preferably imposed on both sets of conditions. This protects the transmission from shifting at speeds which would cause damage to the transmission. (For this reason and for economy considerations, all shifts are restricted to programmed limits of RPM). Each time park is executed, whether through positive park selection or manual selection, the parking brake is automatically engaged.

Shifting Out Of Park

To allow shifting out of park other sets of conditions are required: the foot brake pedal is depressed, the parking brake is engaged, the seat belt buckle is fastened, the engine RPM is below a programmed limit and the ignition key is in the lock. Normally, the ignition is turned on and a range shift is requested. In that case the shift will be made if the conditions are met. In addition to executing the shift, the controller will automatically release the parking brake and lock the doors.

Override Mode

In the event the ignition key is in the lock but not turned on and the override switch is closed to provide power to the system, neutral range is automatically selected and the shift is executed without any other requirements.

Speed Limitations On Shifting

To prevent shifting to a range when the vehicle speed is too high for the gear ratio available in that range, each range selection except neutral and overdrive will not function if the vehicle speed is greater than values individually programmed for each range. In addition, a shift from reverse is prevented if the vehicle speed is too high.

Software Routines

The operations described above are carried out under control of the microprocessor 100 in accordance with its program. The principle parts of the program are an initialization routine, a main loop, an input test routine and a shift routine. The initialization routine (INIT) is effective upon power up to set up the system. The main loop (FIG. 5) calls the initialization routine and then continually repeats the steps of calling up the input test routine and triggering the watchdog circuit. The input test routine checks for the status of the ignition circuit and for operator presence in the drivers seat, calls up the shift routine when necessary, and sets some timeout functions. The shift routine is called up by an interrupt signal from the selector switches or by the input test routine.

Figure 6:
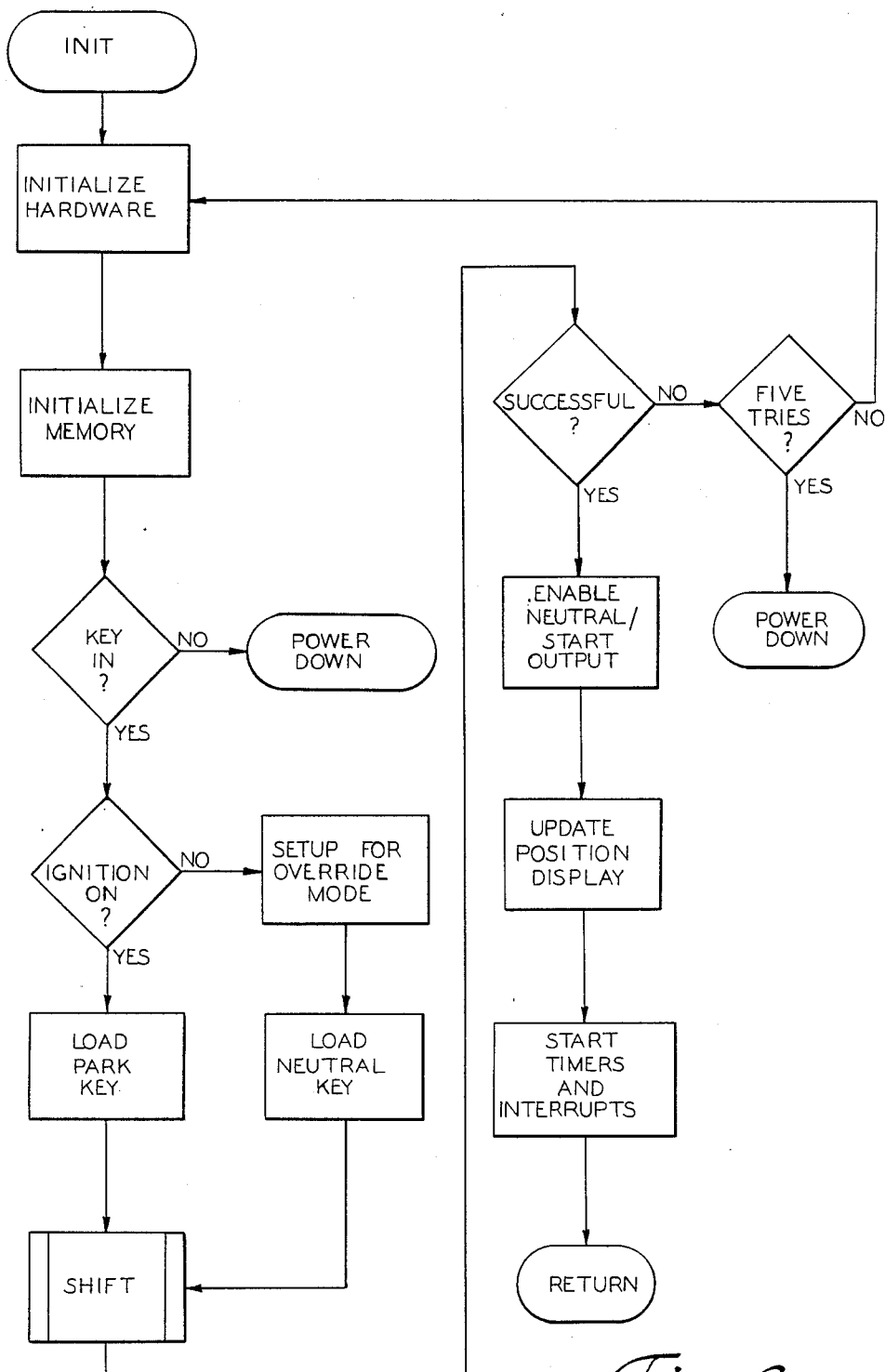

Initialization Routine: When power is first applied to the system the initialization routine is called up. As shown in FIG. 6, the hardware and memory are initialized and a test is made for the presence of the key in the ignition. If it is absent the system power is shut off. This feature is used to foil attempts to "hot wire" the ignition system for the purpose of operating the vehicle without a key. Next a test is made for the ignition being turned on. If not, it is assumed that the system was powered up by the override switch 18 and the system is set up for override mode. A neutral key is loaded into RAM and the shift routine is called. If the ignition is on a park key is loaded into the RAM location and the shift routine is called. The term "key" as used here is a value placed into a particular memory location which denotes the shift range which is approved by the microprocessor. If the shift attempt fails five consecutive times the system powers down. If the shift is successful the neutral/start switch 136 is enabled and the position indicator 15 is updated.

Figures 5, 7:
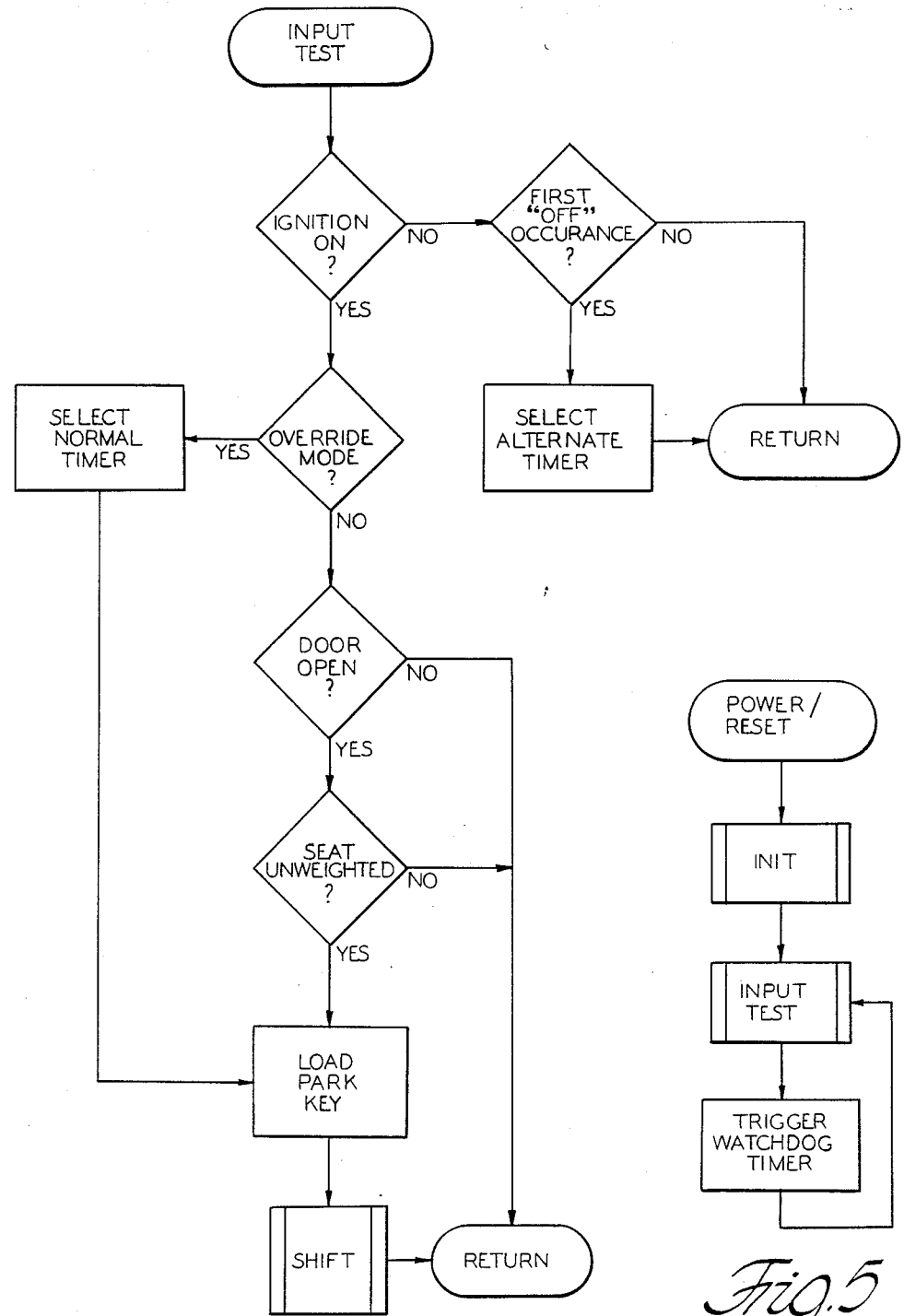
FIGS. 5, 6, 7, 8a and 8b are flow charts illustrating the program of the computer of FIG. 4.

Input test routine: The input test routine frequently looks for certain inputs to the system. As shown in FIG. 7, the routine first checks the ignition circuit. If it is off a timer is set to countdown to a power off condition and the program passes to the main loop. If the ignition is on a check of the override switch is made. If override is on another timer is set to power down, the park key is loaded and the shift routine is called. If the override mode is off the door switch and seat switch are checked. If they indicate operator absence the park key is loaded and the shift routine is called.

Figure 8A:
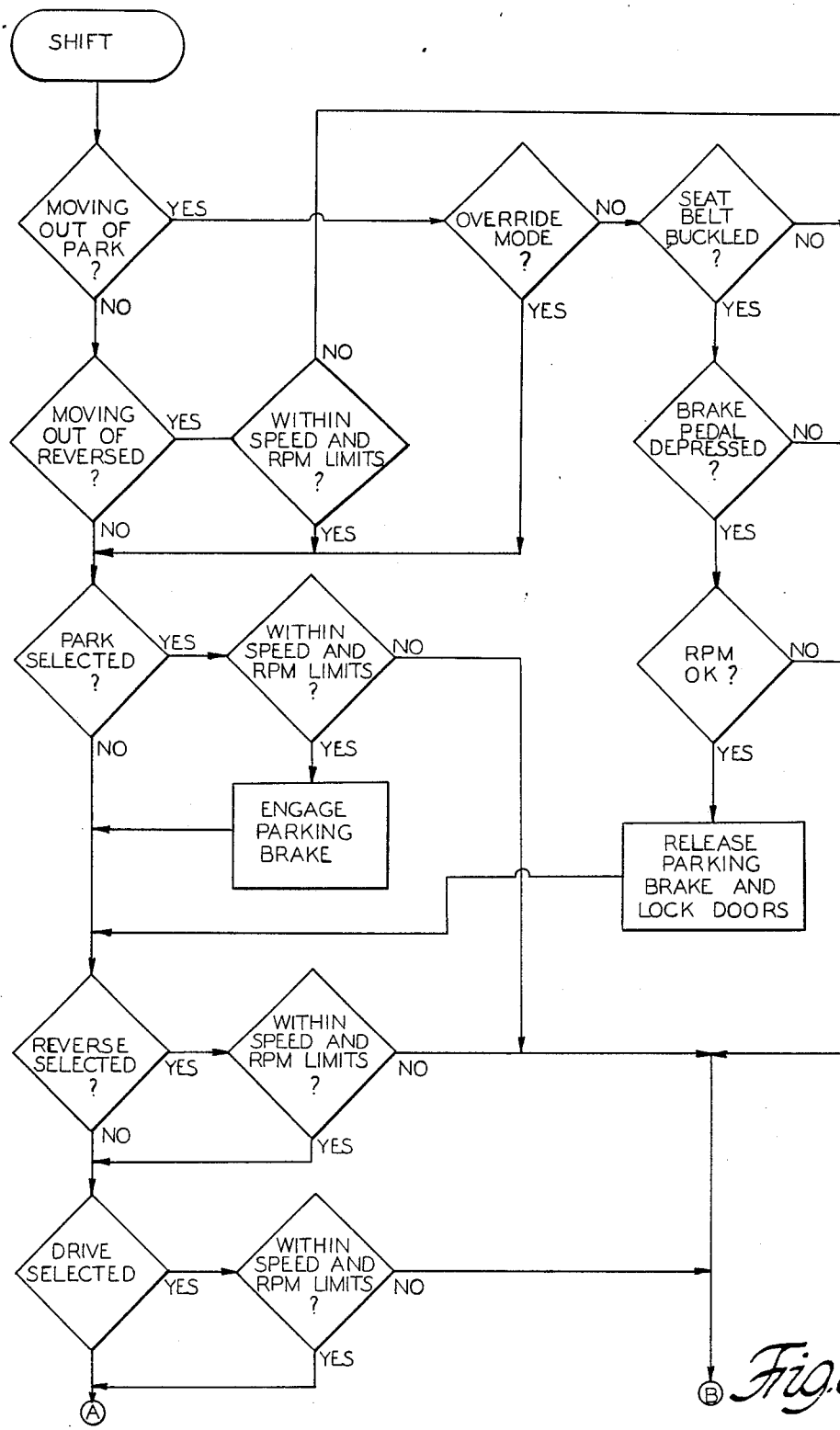
Figure 8B:
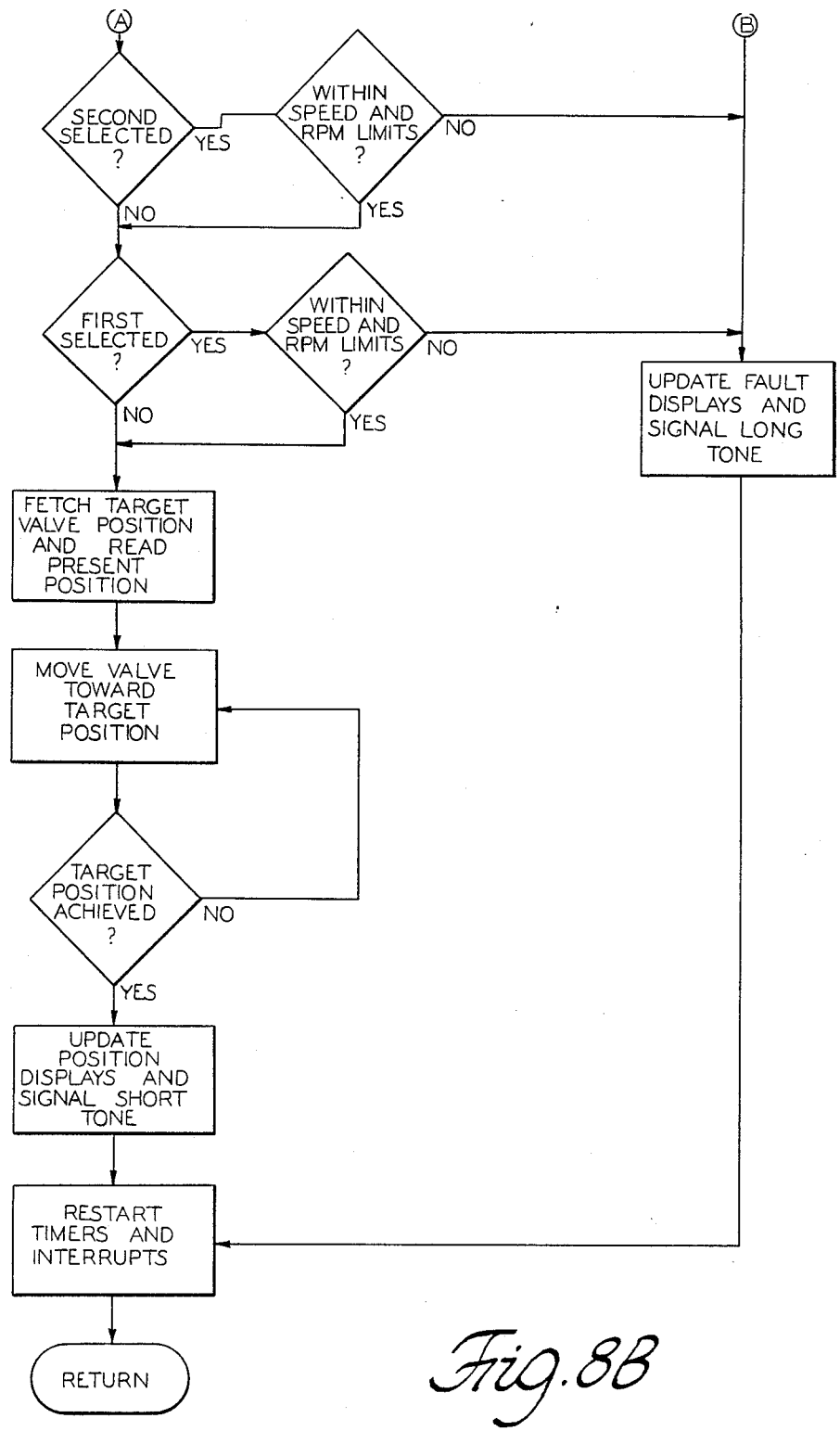

Shift routine: FIGS. 8a and 8b show the shift routine logic. When a shift is called for the key for the specific shift is loaded into RAM. The program can then refer to the key as needed. The first test is for moving out of park. Assuming such a shift has been requested, if the override mode is not active a check is made for the seat belt buckle, brake pedal, and engine RPM statuses. (It is assumed that the parking brake is set since it is actuated automatically upon moving into park). If each status is correct the parking brake is released, the doors are locked and the program progresses through the shift. If the override mode is active the status checks are bypassed.

If the request is not to move out of park, checks are made for a selection to move out of reverse or to move into park, reverse, drive, second or first. If the test is affirmative for any of these checks a test is made for the proper engine speed and vehicle speed for that particular shift before the shift can proceed. No check for neutral or overdrive is necessary since they have no speed limits.

Provided that the various system checks are successfully passed, the target valve position for the requested shift is retrieved and the present position is read. Then the motor is moved toward the target position until the target is achieved. The position display 15 is updated and the audio transducer 138 is activated to signal shift completion.

It will thus be seen that the control system for transmission range selection provides advantages over conventional systems since it restricts shifts to those which are not harmful to the transmission, it provides some automatic shifts into park to relieve the operator of remembering to always make that selection, and it offers other automatic services such as actuating the parking brakes and door locks at appropriate times.

The embodiments of the invention in which an exclusive property or privilege is claimed are defined as follows:

1. In an automotive vehicle, an electronic transmission controller for an automatic transmission having neutral, reverse, forward and park ranges and subject to range selection by electrical signals from the controller, the controller comprising;
   - speed sensors for sensing vehicle speed and engine speed,
   - ignition sensors for sensing whether the ignition is on and whether the key is in the ignition switch,
   - means for controlling the transmission park range in response to preset values of sensed vehicle conditions including programmable electronic means coupled to the sensors for producing electrical signals for range selection, the electronic means being programmed to limit the transmission to park range on the basis of prescribed sensor conditions,
   - said vehicle being equipped with a power operated parking brake and wherein the electronic means produced a brake signal, and
   - actuator means responsive to the brake signal for applying the parking brake when the transmission is shifted to its park range.

2. The invention as defined in claim 1 wherein the electronic means is programmed to issue a release brake signal when the transmission is shifted out of its park range, causing the actuator means to release the brake.

* * * * *